(12) United States Patent
Bapp et al.

(10) Patent No.: US 12,395,054 B2
(45) Date of Patent: Aug. 19, 2025

(54) METHOD FOR PRODUCING A COMPONENT OF AN ELECTROMECHANICAL TRANSDUCER

(71) Applicant: Gehring Technologies GmbH + Co. KG, Ostfildern (DE)

(72) Inventors: Jaro Bapp, Renningen (DE); Andreas Wiens, Sachsenheim (DE); Wolfram Lohse, Plochingen (DE)

(73) Assignee: Gehring Technologies GmbH + Co., Ostfildern (DE)

( * ) Notice: Subject to any disclaimer, the term of this patent is extended or adjusted under 35 U.S.C. 154(b) by 550 days.

(21) Appl. No.: 17/628,019

(22) PCT Filed: Jun. 3, 2020

(86) PCT No.: PCT/EP2020/065275
§ 371 (c)(1),
(2) Date: Jan. 18, 2022

(87) PCT Pub. No.: WO2021/013413
PCT Pub. Date: Jan. 28, 2021

(65) Prior Publication Data
US 2022/0263390 A1     Aug. 18, 2022

(30) Foreign Application Priority Data
Jul. 19, 2019   (DE) ..................... 10 2019 119 666.3

(51) Int. Cl.
H01F 7/06      (2006.01)
H02K 3/28      (2006.01)
(Continued)

(52) U.S. Cl.
CPC ............... *H02K 15/35* (2025.01); *H02K 3/28* (2013.01); *B23K 15/0006* (2013.01); *B23K 26/244* (2015.10); *B23K 2101/38* (2018.08)

(58) Field of Classification Search
CPC ........... B23K 15/0006; B23K 15/0053; B23K 15/0081; B23K 26/242; B23K 26/244;
(Continued)

(56) References Cited

U.S. PATENT DOCUMENTS 6,915,556 B2   7/2005   Lenoir et al.
7,005,773 B2   2/2006   Nakamura
(Continued)

FOREIGN PATENT DOCUMENTS

CN   1520006 A    8/2004
CN   100452619 C  1/2009
(Continued)

OTHER PUBLICATIONS

German Examination Report, pp. 1-11. Jun. 30, 2020.
(Continued)

*Primary Examiner* — Paul D Kim
(74) *Attorney, Agent, or Firm* — BOND, SCHOENECK & KING, PLLC; George R. McGuire

(57) ABSTRACT

The invention relates to a method for producing a component of an electromechanical transducer that has windings, as well as to the component itself.

12 Claims, 3 Drawing Sheets

(51) Int. Cl.
*H02K 15/35* (2025.01)
*B23K 15/00* (2006.01)
*B23K 26/244* (2014.01)
*B23K 101/38* (2006.01)

(58) Field of Classification Search
CPC ... B23K 2103/12; B23K 2101/38; H02K 3/28
See application file for complete search history.

(56) References Cited

U.S. PATENT DOCUMENTS

| | | |
|---|---|---|
| 8,443,509 B1 | 5/2013 | De Souza et al. |
| 11,183,906 B2 * | 11/2021 | Zeadan ............... H02K 15/0081 |
| 11,349,364 B2 * | 5/2022 | Hein .................... H02K 15/105 |
| 2002/0041129 A1 * | 4/2002 | Oohashi .................. H02K 3/50 |
| | | 310/179 |
| 2014/0338183 A1 | 11/2014 | Nishiyama et al. |
| 2017/0346358 A1 | 11/2017 | Fukuda et al. |
| 2018/0248430 A1 | 8/2018 | Umesaki et al. |

FOREIGN PATENT DOCUMENTS

| | | |
|---|---|---|
| CN | 109463027 A | 3/2019 |
| DE | 102016009781 A1 | 2/2017 |
| JP | 2013109948 A | 6/2013 |
| WO | 2018077511 A1 | 5/2018 |

OTHER PUBLICATIONS

International Search Report and Written Opinion, pp. 1-12. Dated Oct. 15, 2020.
Translated CN Office Action, dated Dec. 8, 2022. pp. 1-16.

* cited by examiner

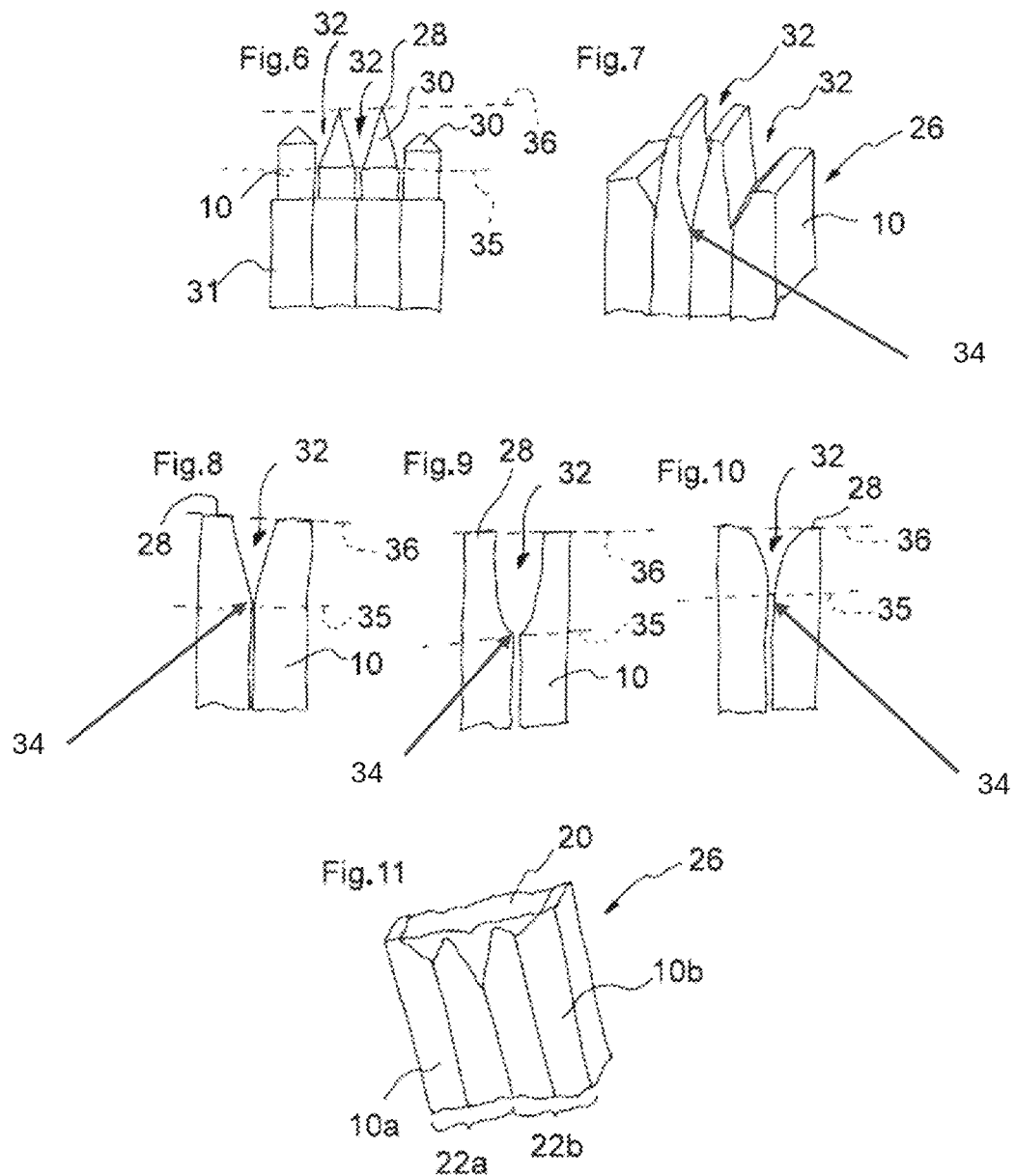

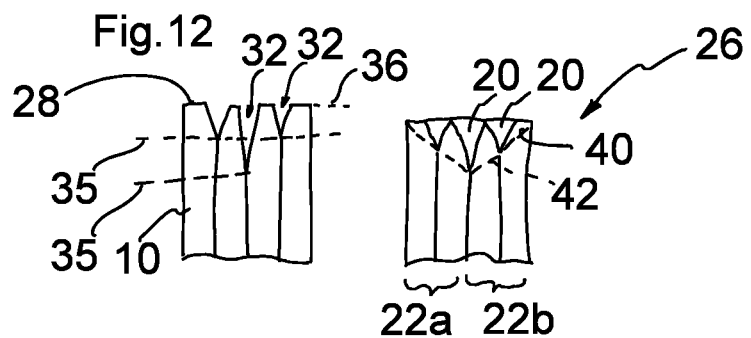
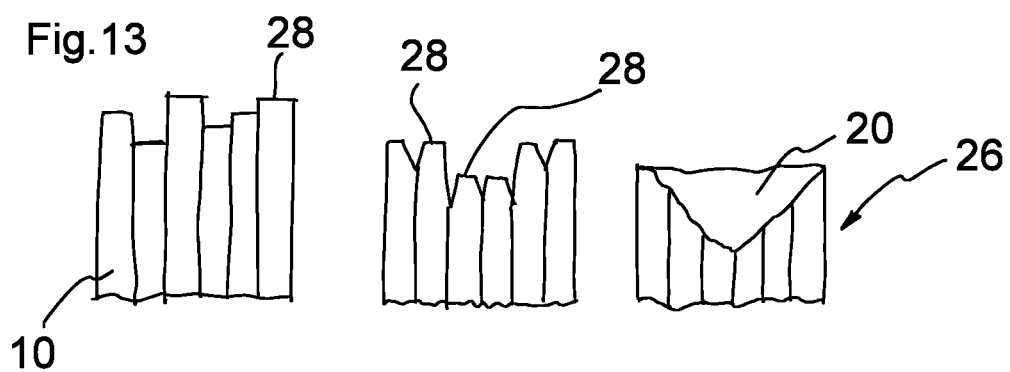
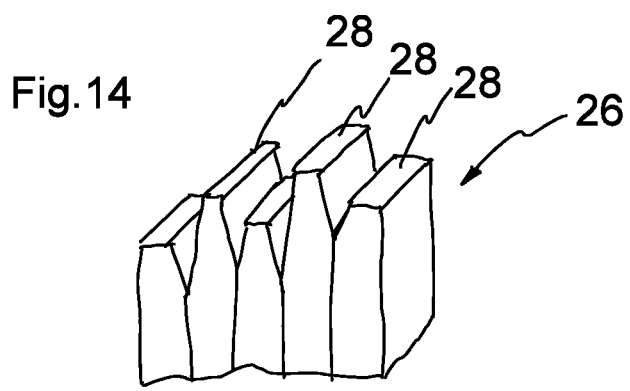

METHOD FOR PRODUCING A COMPONENT OF AN ELECTROMECHANICAL TRANSDUCER

CROSS REFERENCE TO RELATED APPLICATIONS

This is a National Stage Application filed under 35 U.S.C. 371 based on International Patent Application No. PCT/EP2020/065275, filed on Jun. 3, 2020, which claims priority to German Patent Application 10 2019 119 666.3 filed Jul. 19, 2019. The entire disclosures of each of the foregoing are hereby incorporated herein by reference in their entireties.

BACKGROUND

There are various manufacturing processes for the production of electric motors or other electromechanical transducers (motors or generators). One is the so-called "hair pin" process, in which copper wires are bent into a given free shape and inserted into the grooves provided in the stator. The open sides of the "hair pins" protruding from the stator are then twisted and welded at the free end according to the electrical circuit diagram.

In beam welding, a laser or electron beam is used to heat and melt the workpiece. The welding takes place in a vacuum or in a shielding gas. The bundled laser beam generated during laser welding is usually less than a millimeter in diameter and typically generates very high temperatures. The resulting weld seam can be made very small.

When connecting winding-forming conductor pieces to produce a component (e.g. rotor or stator) of an electromechanical transducer that has windings, the weld seam can represent a modification of the conductor cross section. As far as possible, the weld seam should provide a connection surface that substantially corresponds to the conductor cross section of the conductor pieces.

SUMMARY OF THE INVENTION

The inventions (methods and device) are based on the object of providing methods and a device, wherein in the methods two or more conductor pieces having a connection surface that is advantageous for electrical conductivity can be interconnected via a weld seam, and wherein the device is intended to provide a component of an electromechanical transducer that has windings and advantageously formed weld seams.

This problem is solved by a method and by components that have windings.

The aspects that are described in connection with the methods also represent embodiments of the components according to the invention that have windings. Conversely, aspects are also described in connection with the components that have windings which relate to embodiments of the methods according to the invention.

In order to produce the connection between two conductor pieces, according to the invention, the steps described below are carried out in a method for producing a component of an electromechanical transducer that has windings.

Molding one of the free ends of two winding-forming conductor pieces which are to be conductively interconnected. In particular, both free ends can be molded. Molding means a change in the shape of the free ends. The molding can be achieved by removing material or by reshaping the material of the conductor pieces. A combination of both is also within the meaning of the invention.

The conductor pieces are arranged and fixed in the component of the electromechanical transducer. The arranging and fixing is carried out in the configuration or geometric arrangement intended for the welding process. Thus, after the arranging and fixing, the position of the conductor pieces no longer has to be changed before welding.

The molding, arranging and fixing can also be carried out in a single work step; however, these are typically carried out in individual steps. It may be the case that the molding takes place first, followed by the arranging and fixing. In the context of the invention, the conductor pieces may also be first arranged and optionally fixed, and subsequently molded.

Within the meaning of the present invention, the molding, arranging and fixing is carried out in such a way that the two conductor pieces abut one another in the intended configuration and a recess which widens toward the free ends is provided between the two conductor pieces. The conductor pieces are thus at least partially in direct surface-to-surface contact and are mutually spaced apart in the region of the widening recess by the recess.

The method according to the invention also provides for welding the two conductor pieces to be connected by means of a beam welding process (electron beam welding or laser beam welding). In this process, the beam is introduced into the widening recess. The beam is introduced in such a way that a conductive weld connection is established which connects the two conductor pieces to be interconnected. The material of the conductor pieces melts and forms the conductive connection between the conductor pieces after solidification. The provision of the above-mentioned recess makes it possible to apply the beam to the conductor pieces along their longitudinal extension over a sufficient area to form a weld seam of sufficient depth ("depth" means the extension of the weld seam or weld connection in the direction of the longitudinal extension of the conductor pieces). Furthermore, the recess allows melted material of the conductor pieces to be accommodated.

Compared to the application of the beam to the conductor pieces from their free ends, the method according to the invention requires a significantly lower energy input and thus a lower proportion of melted material in order to provide a weld seam having a corresponding cross section. The corresponding conductor pieces are also connected via a weld connection which is substantially "between" the conductor pieces and is not, so to speak, on their free ends. The weld connection is thus typically arranged between non-melted original material of the conductor pieces.

The two conductor pieces to be interconnected can have the same conductor cross section. The conductor cross section is to be regarded as the area of the conductor pieces orthogonal to their longitudinal extension. In addition, the conductive weld connection or its conductive cross-sectional area can have at least 80%, in particular 90%, in particular 95%, in particular 100% of the conductor cross section of the conductor pieces. The conductive cross-sectional area of the weld connection is typically to be regarded as the cross-sectional area along the longitudinal extension of the conductor pieces which interconnects said pieces. In other words, therefore, effectively the cross-sectional area of the material bridge that interconnects the two conductor pieces. A sufficiently dimensioned connection between the conductor pieces prevents a local resistance that is too high, which can lead to damage to the material during operation.

Further, according to the invention, it can be provided, that the two conductor pieces to be interconnected have the same conductor cross section and that the conductive weld connection has at most 140%, in particular 130%, in particular 120%, in particular 110% of the conductor cross section of the conductor pieces. This prevents the two conductor pieces from being connected over too large an area.

As already explained above, the invention also relates to a method for producing a component of an electromechanical transducer that has windings, in which multiple (that is, more than two) conductor pieces are to be interconnected. The corresponding method comprises the following steps:

Molding free ends of winding-forming conductor pieces which are to be conductively interconnected. In particular, all free ends of the conductor pieces to be interconnected can be molded. As already explained above, molding means both reshaping and removing material.

Arranging and fixing the conductor pieces to be interconnected in the component of the electromechanical transducer in a configuration intended for a welding process. As already explained above, the combination of molding, arranging and fixing as well as the sequential execution is also within the meaning of the invention.

The molding, arranging and fixing is carried out in such a way that the conductor pieces abut one another in an intended series arrangement and a recess which widens toward the free ends with a recess end facing away from the free ends is provided between adjacent conductor pieces. The recess end thus essentially forms the "bottom" of the "depression" formed by the recess between the free ends.

In a possible method variant, at least one recess end of a widening recess between conductor pieces which are to be connected (welded) on both sides to adjacent conductor pieces is arranged further away from the free ends of the conductor pieces than the recess end of a widening recess between conductor pieces of which one is to be connected on one side only to an adjacent conductor piece. Within the meaning of the invention, in particular all such recess ends between conductor pieces which are to be connected on both sides to other conductor pieces are arranged further away from the free ends of the conductor pieces than the recess ends between conductor pieces of which one is to be connected on one side only.

In another possible method variant, a recess between conductor pieces which are to be connected on both sides to adjacent conductor pieces extends from the free ends of these conductor pieces further along the longitudinal extension of these conductor pieces than a widening recess between conductor pieces of which one is to be connected on one side only to an adjacent conductor piece. Within the meaning of this invention, the conditions of these two method variants can of course also be present together. A first recess in a series arrangement between an inner conductor piece and an outer conductor piece can thus effectively have a depth which is less than a depth of a recess in a series arrangement between two inner conductor pieces.

Correspondingly, in the case of the already welded conductor pieces (or in the case of the component that has windings), the weld connections between conductor pieces which are to be connected on both sides to adjacent conductor pieces extend further along the longitudinal extension of the conductor pieces than weld connections between conductor pieces of which one is connected on side only to an adjacent conductor piece.

In the case of the already welded conductor pieces (or in the case of the component that has windings), it may also be the case that the weld connections between conductor pieces which are to be connected on both sides to adjacent conductor pieces have a larger cross section than a weld connection between conductor pieces of which one is connected on one side only to an adjacent conductor piece.

The method further comprises welding the conductor pieces to be connected by means of a beam welding method. The beam is introduced into the widening recesses so that a conductive weld connection is established which connects the conductor pieces to be interconnected.

The fact that recesses that are effectively internal (i.e. recesses between conductor pieces that are to be connected on both sides) go deeper in the direction of the longitudinal extension of the conductor pieces than the recesses in the outer region promotes the formation of a weld seam which can be designed to extend deeper in the central region of the arrangement of the conductor pieces than in the outer region.

According to the invention, the series arrangement of the conductor pieces (in the case of the component that has windings or when carrying out the method) can comprise a first conductor piece pair made up of two adjacent conductor pieces interconnected via a first weld connection, wherein the conductor piece pair having a first effective conductor cross section in the connected state. The first conductor piece pair is connected to a further conductor piece or a second conductor piece pair via a second weld connection. This second weld connection has a conductor cross section which is between 80% and 140% of the effective conductor cross section of the first conductor piece pair. Such a design of the weld connections takes into account the fact that outer conductor piece pairs can be used, in terms of circuit technology, effectively as one conductor and can be connected to a further conductor piece pair or a conductor piece, so that a corresponding connection is to be formed effectively from the first conductor piece pair to the second conductor piece pair.

The individual conductor pieces can each have the same conductor cross sections.

During welding, it may be the case that first the conductor pieces that are to be connected on both sides to adjacent conductor pieces are welded and subsequently conductor pieces are welded that are connected on only one side to conductor pieces that are already interconnected, in order to provide the overall connection. It is therefore possible to first provide the connections that require the most material or have the largest cross sections and then provide the connections between the conductor pieces that require smaller amounts of material or smaller conductor cross sections.

In a series arrangement, the molding, arranging and fixing can be carried out in such a way that the depth of the recesses between conductor pieces increases from the outside of the series arrangement to the inside. Accordingly, when welding a series arrangement, the conductor pieces can be welded from the inside to the outside. The weld seams of a series arrangement produced during welding can accordingly increase in depth from the outside to the inside.

The weld seam of a series arrangement can increase in depth from the outside to the inside and can form a substantially straight end on the side of the previously free ends. This can be the case with the methods as well as with the component that has the windings.

The weld seam can have a substantially triangular cross section. This can be the case with the methods as well as with the component that has the windings.

Directly before welding, the free ends of the conductor pieces to be connected can end at the same height.

The recess between two adjacent conductor pieces can have a triangular cross section. Also within the meaning of the invention are other recess shapes, such as convex shapes of the conductor piece ends or also shapes with multiple flat surfaces which are at different angles to each other and form the recess which widens toward the free ends. Trough-like recesses with a concave shape of the free ends of the conductor pieces on the respective side facing the recess are also conceivable.

It is also within the meaning of the invention if the recess between two conductor pieces has, at its upper, open end (effectively at the widest point), an area which corresponds to at least 80%, in particular 90%, in particular 100%, in particular 110%, in particular 120% of the area of one of the conductor pieces in the non-molded state.

When connecting two conductor pieces, the recess is typically formed at the free end of the two conductor pieces toward the center of the conductor pieces when viewing at the free end, i.e. material is removed or reshaped.

The molding can be done at the same time as conductor pieces are cut to length.

One invention is also a component of an electromechanical transducer that has windings per se and comprises at least two interconnected winding-forming conductor pieces, wherein the conductor pieces are integrally bonded via a weld connection. The conductive weld connection in turn has a cross section of at least 80%, in particular 85%, in particular 90%, in particular 95% of a conductor cross section of the conductor pieces. As an alternative or in addition, the weld connection can have a cross section of at most 140%, in particular 130%, in particular 120%, in particular 110% of the conductor cross section of the conductor pieces.

One invention is a component of an electromechanical transducer that has windings and comprises at least two winding-forming conductor pieces which are integrally bonded to one another via a weld connection, wherein the weld connection is formed substantially between the conductor pieces. This means that the weld connection is not formed by a melted material bridge on the previously free ends of the conductor pieces, but rather the material of the conductor pieces extends along the longitudinal extension of the conductor pieces on either side of the weld connection, and this material is not part of the weld connection but rather was not melted during the welding process.

One invention is a component of an electromechanical transducer that has windings and comprises multiple winding-forming conductor pieces which are integrally bonded to one another in a series arrangement via a weld connection. The series arrangement of the conductor pieces comprises a first conductor piece pair made up of two adjacent conductor pieces interconnected via a first weld connection. The conductor piece pair has a first effective conductor cross section, which corresponds to the sum of the conductor cross sections of the conductor pieces of the conductor piece pair, and is connected to a further conductor piece or a second conductor piece pair via a second weld connection. The second weld connection has a conductor cross section which is between at least 80%, in particular 85%, in particular 90%, in particular 95%, and at most 140%, in particular 130%, in particular 120%, in particular 110% of the effective conductor cross section of the first conductor piece pair. The individual conductor pieces can in particular each have the same conductor cross sections.

One invention is a component of an electromechanical transducer that has windings and comprises multiple winding-forming conductor pieces which are integrally bonded to one another in a series arrangement via a weld connection, wherein the weld connections of the series arrangement increases in depth from the outside to the inside along the longitudinal extension of the conductor pieces.

In the case of the components that have windings, the weld connections can have a substantially triangular cross section. The individual triangular cross sections of the weld connections can also overlap in border regions.

BRIEF DESCRIPTION OF THE DRAWINGS

Further features, possible applications and advantages of the invention result from the following description of embodiments of the invention, which are explained with reference to the drawings, wherein the features may be essential to the invention, both in isolation and in different combinations, without this being explicitly mentioned again. In the drawings:

FIG. 6 shows a further series arrangement of conductor pieces;
FIG. 7 shows a further series arrangement of conductor pieces;
FIG. 8 shows two conductor pieces between which a recess is arranged;
FIG. 9 shows two conductor pieces between which a recess is arranged;
FIG. 10 shows two conductor pieces between which a recess is arranged;
FIG. 11 shows a series arrangement of conductor pieces that are welded together;
FIG. 12 shows a further series arrangement of conductor pieces before and after welding;
FIG. 13 shows a series arrangement of conductor pieces in different process steps;
FIG. 14 shows a further series arrangement of conductor pieces.

DETAILED DESCRIPTION

In the following figures, corresponding components and elements have the same reference signs. For the sake of clarity, not all of the reference signs are shown in all of the figures.

Figure 1:
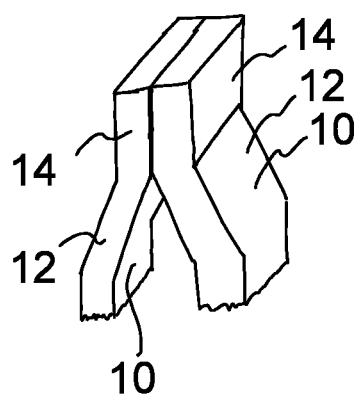
FIG. 1 shows two conductor pieces.

FIG. 1 shows two conductor pieces 10 which are arranged and fixed in a component of an electromechanical transducer (not shown further). The two conductor pieces 10 each have an angled portion 12 which ends in a region 14 in which the conductor pieces 10 abut one another.

Figure 2:
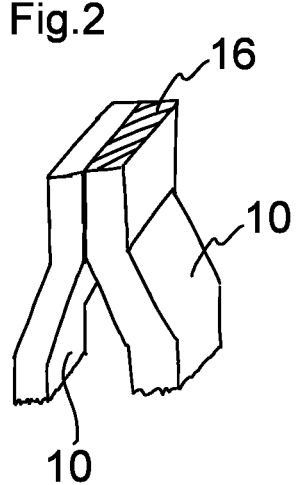
FIG. 2 shows further details of the conductor pieces from FIG. 1.

The cross-sectional area of the conductor pieces 10 along their longitudinal extension forms an effective conductor cross section 16 of a relevant conductor piece 10. For the conductor piece 10 shown on the right, this is highlighted by hatching in FIG. 2.

Figure 3:
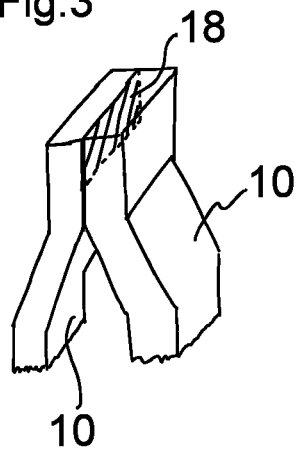
FIG. 3 shows further details of the conductor pieces from FIG. 1.

In FIG. 3, a desired cross section 18 of a weld seam to be formed between the conductor pieces is likewise shown by hatching. In order to achieve as uniform a resistance as possible, it is useful if the cross section 18 of the weld seam connecting the conductor pieces substantially corresponds to the conductor cross section 16 of the respective conductor pieces 10 to be connected. For example, the cross section 18 of the weld seam can have at least 80% and at most 140% of the conductor cross section 16 of the respective conductor pieces.

Figure 4:
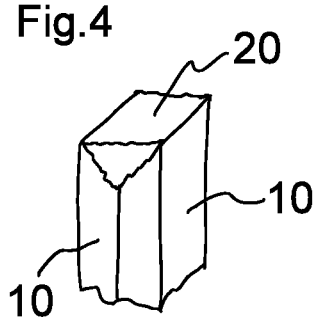
FIG. 4 shows two conductor pieces connected by a weld seam.

FIG. 4 shows two conductor pieces 10 connected by means of a weld seam 20, with the cross section 18 of the weld seam 20 corresponding to the cross section 18 identified as desirable in FIG. 3.

Figure 5:
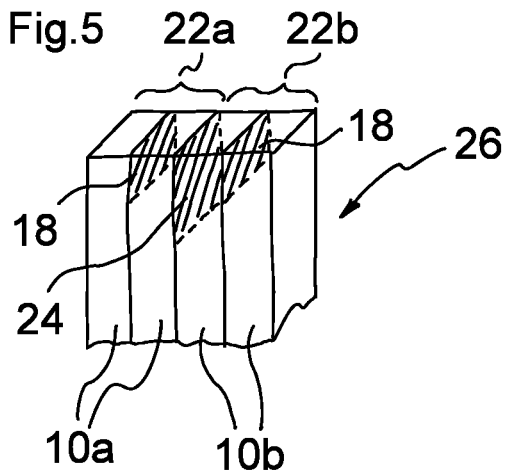
FIG. 5 shows a series arrangement of conductor pieces.

FIG. 5 shows a configuration in which two first conductor pieces 10a are connected to form a common first conductor piece pair 22a and are accordingly connected by circuitry in a component (e.g. a stator) of an electromechanical transducer. The conductor pieces 10b, on the other hand, are connected to form a common second conductor piece pair 22b and are accordingly connected by circuitry in the component of the electromechanical transducer. The connection between the respective first and second conductor pieces 10a and 10b to form the individual conductor piece pairs 22a and 22b takes place in accordance with the weld seam formation as shown in FIG. 4 with the cross section 18. The connection of the conductor piece pairs 22a and 22b, however, takes place in such a way that the sum of the individual conductor cross sections 16 of the conductor piece pairs 22a, 22b is added up and the conductor piece pairs 22a, 22b are then treated as a single conductor piece, with the cross section corresponding to the sum of the individual conductor piece cross sections 16. Since in the present example all the conductor pieces 10 have the same cross section 16, it is desirable if the cross sections 18 of the weld connection between the individual conductor pieces 10 correspond to the conductor cross section 16 of the individual conductor pieces 10 and the cross section 24 between the conductor piece pairs 22 is accordingly twice as large.

FIG. 6 shows a series arrangement 26 of four conductor pieces 10, wherein the conductor pieces 10 each have a round cross section and each being molded at their free ends 28. The molding has been carried out in such a way that each conductor piece 10 has a tip 30. Although the conductor pieces 10 are slightly spaced apart from one another by insulation 31 that is present in the lower region, this is to be understood as an abutment within the meaning of the present invention, since the conductor pieces are arranged sufficiently close to one another to form a weld seam. There are recesses 32 between the respective tips 30.

The recesses 32 are designed in such a way that they each widen toward the free ends 28. The recesses 32 each have a recess end 34 on the side of the recesses 32 facing away from the free ends 28. The position of the recess ends 34 is illustrated by the line 35. In the present case, all of the recess ends 34 are at the same distance from the free ends 28 or an upper edge 36 of the free ends 28.

FIG. 7 shows a further possible series arrangement 26 of four conductor pieces 10. The conductor pieces 10 used in this example have a rectangular cross section.

FIG. 8-10 show examples of possible shapes of recesses 32. FIG. 8 shows a recess having a triangular cross section. FIG. 9 shows a recess which is realized by molding the conductor pieces with a concave shape of the conductor piece ends. FIG. 10 shows a recess which is realized by molding the conductor pieces with a convex shape of the conductor piece ends.

FIG. 11 shows a weld seam which can be realized, for example, by welding the series arrangement 26 from FIG. 7. The individual weld connections 20 each have triangular cross sections. The cross sections of the weld connections 20 increase from the outside to the inside in each case.

FIG. 12 shows, similarly to FIG. 5 or FIGS. 6, 7 and 11, the connection of four conductor pieces, of which two in each case form a conductor piece pair 22. The weld seams 20 between the individual conductor pieces 10 are triangular in each case (right-hand illustration). Overall, this also results in a triangular-shaped weld zone 40. The weld zone 40 is described effectively by the triangle 42 enveloping the weld seams. FIG. 12 shows, on the left, the individual conductor pieces 10 in the arranged and fixed state, directly before welding. The position (indicated by lines 35) of the recess ends 34 is such that the outer recess ends 34 are closer to the free ends 28 (these are presently at the same height and their position is indicated by the line 36) of the conductor pieces 10. The outer conductor pieces 10 are also molded on only one side, namely on their side facing the relevant recess 32.

The interconnection of six conductor pieces 10 is shown in FIG. 13. The melting zone or weld zone 40 is also triangular in this example. In the present case, the material has been melted in such a way that individual weld seams between the individual conductor pieces are no longer visible, but the entire weld zone 40 has a uniform triangular shape.

To form the weld in FIG. 13, the procedure was as follows: the individual conductor pieces were first arranged and fixed in the arrangement intended for the weld (left-hand illustration) and then molded, whereby this molding also included cutting the conductor pieces to length (middle illustration). The individual conductor pieces were then welded using a beam welding process (right-hand illustration).

FIG. 14 shows a further series arrangement 26 directly before the welding. The individual conductor pieces 10 are arranged and fixed in such a way that their free ends 28 end at different heights.

The configurations shown in the figures can be produced by means of the methods according to the invention and can also be part of the components of an electromechanical transducer according to the invention that have windings.

The invention claimed is:

1. Method for producing a component of an electromechanical transducer that has windings, wherein the method comprises the steps of:
    molding a free end of each of two winding-forming conductor pieces which are to be conductively interconnected;
    arranging and fixing the two winding-forming conductor pieces to be interconnected in the component of the electromechanical transducer in a configuration intended for a welding process,
    wherein the molding, arranging and fixing is carried out in such a way that the two conductor pieces abut one another in the intended configuration and a recess which widens toward the free ends is provided between the two conductor pieces; and,
    welding the two conductor pieces to be connected by means of a beam welding process, wherein the beam is introduced into the widening recess so that a conductive weld connection is established which connects the two conductor pieces to be interconnected; and
    characterized in that the two conductor pieces to be interconnected each have a conductor cross section that are the same and in that the conductive weld connection has a cross section of at least 80% and at most 140% of the conductor cross section of the conductor pieces.

2. Method for producing a component of an electromechanical transducer that has windings, wherein the method comprises the steps of:
    molding free ends of winding-forming conductor pieces which are to be conductively interconnected;

arranging and fixing the conductor pieces to be interconnected in the component of the electromechanical transducer in a configuration intended for a welding process, wherein the molding, arranging and fixing is carried out in such a way that the conductor pieces abut one another in an intended series arrangement and a recess which widens toward the free ends with a recess end facing away from the free ends is provided between adjacent conductor pieces, wherein either one recess end of a widening recess between conductor pieces which are to be connected on both sides to adjacent conductor pieces is arranged further away from the free ends of the conductor pieces than the recess end of a widening recess between conductor pieces of which one is to be connected on one side only to an adjacent conductor piece, or wherein one recess between conductor pieces which are to be connected on both sides to adjacent conductor pieces extends from the free ends of the conductor pieces further along a longitudinal extension of the conductor pieces than a widening recess between the conductor pieces of which one is to be connected on one side only to an adjacent one of the conductor pieces; and, welding the conductor pieces to be connected by means of a beam welding process, wherein the beam is introduced into the widening recess so that a conductive weld connection is established which connects the two conductor pieces to be interconnected.

3. Method according to claim 2, characterized in that the series arrangement of the conductor pieces comprises a first conductor piece pair made up of two adjacent conductor pieces interconnected via a first weld connection, which first conductor piece pair has, in the connected state, a first effective conductor cross section which corresponds to the sum of conductor cross sections of the conductor pieces of the first conductor piece pair, and is connected to a further conductor piece or a second conductor piece pair via a second weld connection, wherein the second weld connection has a conductor cross section which is between 80% and 140% of the first effective conductor cross section of the first conductor piece pair.

4. Method according to claim 2, characterized in that each of the conductor pieces each have the same conductor cross sections.

5. Method according to claim 2, characterized in that, during welding, the conductor pieces that are to be connected on both sides to adjacent conductor pieces are welded and subsequently conductor pieces are welded that are connected on only one side to conductor pieces that are already interconnected, in order to provide an overall connection.

6. Method according to claim 2, characterized in that, in the intended series arrangement, the molding, arranging and fixing is carried out in such a way that the recesses between conductor pieces have a depth that increases from an outside of an series arrangement to the inside.

7. Method according to claim 2, characterized in that, during the welding of the series arrangement the welding of the conductor pieces is performed from an inside of the series arrangement to an outside.

8. Method according to claim 2, characterized in that weld seams of the intended series arrangement produced during the welding increase in depth from an outside of the series arrangement to an inside along the longitudinal extension of the conductor pieces.

9. Method according to claim 2, characterized in that weld seams of the intended series arrangement produced during the welding increase in depth from an outside of the series arrangement to an inside along the longitudinal extension of the conductor pieces and a substantially straight end is formed on the side of the free ends.

10. Method according to claim 2, characterized in that, directly before the welding, the free ends of the conductor pieces to be connected end at a same height.

11. Method according to claim 2, characterized in that a weld seam is formed that has a substantially triangular cross section.

12. Method according to claim 2, characterized in that the recess between two adjacent conductor pieces has a triangular cross section.

* * * * *